(12) United States Patent
Suriyal et al.

(10) Patent No.: US 12,021,938 B1
(45) Date of Patent: Jun. 25, 2024

(54) DEVICE PROVISIONING WITH A NETWORK PROFILE

(71) Applicant: HEWLETT PACKARD ENTERPRISE DEVELOPMENT LP, Spring, TX (US)

(72) Inventors: Shailendra Singh Suriyal, Karnataka (IN); Ravi Suhane, Karnataka (IN); Amit Agrawal, Karnataka (IN); Nagendra Babu Rapaka, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/306,433

(22) Filed: Apr. 25, 2023

(51) Int. Cl.
G06F 15/177 (2006.01)
H04L 9/32 (2006.01)
H04L 9/40 (2022.01)
H04L 67/306 (2022.01)

(52) U.S. Cl.
CPC .......... H04L 67/306 (2013.01); H04L 9/3228 (2013.01); H04L 63/101 (2013.01)

(58) Field of Classification Search
CPC ... H04L 67/306; H04L 9/3228; H04L 63/101; H04L 41/28; H04L 41/08; H04L 41/085; H04L 41/0853
See application file for complete search history.

(56) References Cited

U.S. PATENT DOCUMENTS

| 11,499,738 | B2 | 11/2022 | Ratakonda et al. | |
| 2015/0195133 | A1 | 7/2015 | Sheets et al. | |
| 2016/0275491 | A1* | 9/2016 | Kaladgi | H04L 63/0853 |
| 2019/0306673 | A1* | 10/2019 | Sharaga | H04W 4/50 |
| 2019/0327591 | A1* | 10/2019 | Karimli | H04L 9/3213 |
| 2019/0386981 | A1* | 12/2019 | Ramesh Kumar | H04L 9/3228 |
| 2021/0400033 | A1 | 12/2021 | Gupta et al. | |
| 2023/0008333 | A1 | 1/2023 | Mittal et al. | |
| 2023/0185957 | A1* | 6/2023 | Brown | H04L 51/42 726/26 |

OTHER PUBLICATIONS

Galaxy Device—Share Your WiFi Password from your Galaxy Device to an Android Device with a QR Code, Jun. 2, 2021, 2 Pgs.

* cited by examiner

Primary Examiner — Joseph R Maniwang
(74) Attorney, Agent, or Firm — Trop, Pruner & Hu, P.C.

(57) ABSTRACT

In some examples, a first user device receives, from a second user device, a provisioning reference and an access token, the provisioning reference and the access token obtained by the second user device as part of a provisioning procedure performed by the second user device with a server. The first user device accesses the server using the provisioning reference and the access token to provision the first user device. The first user device receives, from the server, a network profile in response to the access token. The first user device connects to a network using the network profile.

20 Claims, 5 Drawing Sheets

DEVICE PROVISIONING WITH A NETWORK PROFILE

BACKGROUND

An electronic device can connect to a network to communicate with other devices over the network. To connect to the network, the electronic device is provided with a network profile that includes various properties associated with the network. The properties in the network profile are used by the electronic device to establish a connection with the network.

BRIEF DESCRIPTION OF THE DRAWINGS

Some implementations of the present disclosure are described with respect to the following figures.

Figure 1:
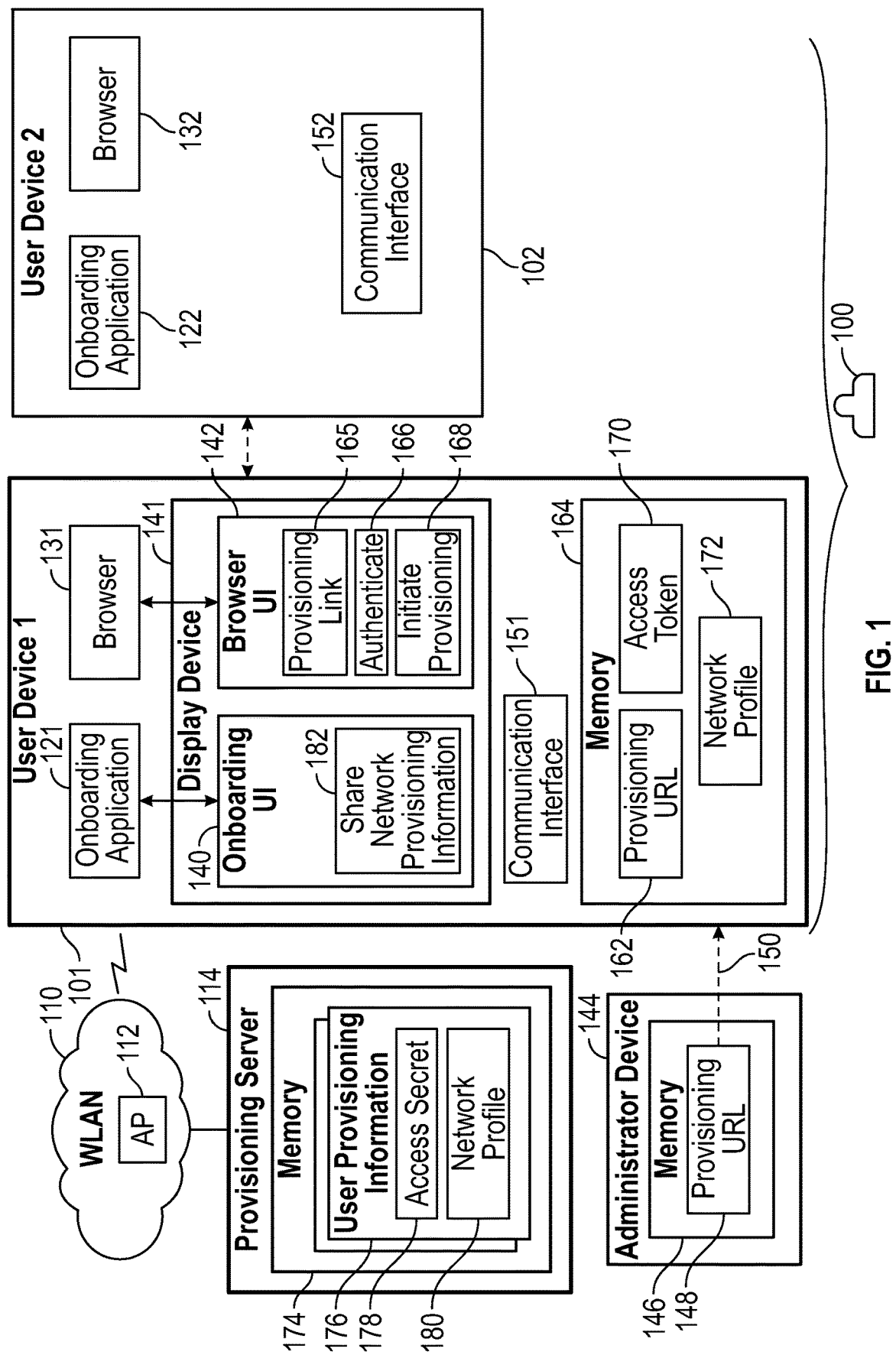
FIG. 1 is a block diagram of an arrangement including user devices, a wireless local area network (WLAN), an administrator device, and a provisioning server, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Certain networks are restricted access networks that allow authorized users to access the networks; however, unauthorized users are unable to access the restricted access networks. Examples of such restricted access networks include enterprise networks, which are networks associated with enterprises such as businesses, education organizations, government agencies, individuals, or any other entities.

Before allowing an electronic device to access a network, an onboarding procedure may be performed with respect to the electronic device. The onboarding procedure may involve a user using a user interface (such as the user interface of a browser or another type of application) to access a destination associated with a specific provisioning reference. The provisioning reference may be in the form of a provisioning uniform resource locator (URL), which if entered into a browser allows access of an onboarding resource used for onboarding electronic devices. An example of such an online resource accessed with a provisioning URL is an onboarding portal (e.g., a website).

More generally, a "provisioning reference" may refer to any information that refers to an onboarding resource associated with provisioning of electronic devices. The resource may be a provisioning portal or any other type of interface, program, or machine.

In an example, once the user has established a connection to the onboarding resource using the provisioning reference, the user can enter onboarding credentials (e.g., a username and password, a certificate, biometric data of the user, etc.) for authentication by a provisioning server. Once authenticated, the user can initiate a provisioning procedure for the electronic device. For example, the electronic device may be loaded with an onboarding application that can be opened by the user once the user is authenticated. The onboarding application can obtain a network profile for the electronic device. The network profile includes various properties associated with a network that the electronic device uses to connect to the network. In some examples, the network can be an enterprise wireless network, such as an enterprise wireless local area network (WLAN), or another type of network.

To onboard multiple electronic devices of a user, the user would have to repeat the foregoing onboarding procedure (access an onboarding resource, enter credentials, perform authentication, perform provisioning, etc.) for each of the multiple electronic devices. Having to repeat the onboarding procedure multiple times is cumbersome and time consuming.

In accordance with some implementations of the present disclosure, a user of multiple user devices can onboard the multiple user devices without having to repeatedly perform a cumbersome onboarding procedure for each of the multiple user devices. A "user device" refers to an electronic device that is owned by or used by a user. The user can perform a full onboarding procedure with respect to a first user device, and after performing the onboarding procedure with respect to the first user device, any other user devices of the user can interact with the first user device to obtain provisioning information so that the other user devices can access a provisioning server to provision the other user devices with a network profile. The other user devices would not have to perform the full onboarding procedure, which saves time and enhances user convenience. For example, a second user device can obtain the provisioning information from the first user device. Note that in some examples, one or more other user devices of the user can obtain the provisioning information from the second user device.

The network profile can include any or some combination of the following properties: a name of a network, such as a Service Set Identifier (SSID) of a WLAN; information of a type of authentication to employ (e.g., Transport Layer Security (TLS) authentication, Passpoint authentication, etc.); data communication rates of communications in the WLAN; a fully qualified domain name (FQDN) of the WLAN, where the FQDN is a domain name that includes all domain levels; and/or other information. More generally, the network profile includes properties that an electronic device uses to connect to the network.

FIG. 1 is a block diagram of an example arrangement that includes user devices 101 and 102 that are associated with a user 100. The user devices 101 and 102 are able to establish communications with a WLAN 110, which includes an access point (AP) 112 (or multiple APs). The AP 112 is able to communicate wirelessly with electronic devices (including the user devices 101 and 102). An electronic device can establish an association with the AP 112 for purposes of communicating over the WLAN 110.

In the example of FIG. 1, two user devices are shown as associated with the user 100. However, in other examples, more than two user devices may be associated with the user 100. Also, although reference is made to a WLAN in some examples, in other examples, techniques or mechanisms according to some implementations of the present disclosure can be used with other types of networks, whether wired or wireless.

In accordance with some examples of the present disclosure, the user devices 101 and 102 include mechanisms to allow onboarding of multiple user devices associated with a given user in a more efficient manner, by avoiding having to repeat a full onboarding procedure for each of the multiple user devices.

Onboarding techniques according to some examples of the present disclosure involves a first user device (e.g., 101) performing the full onboarding procedure with a provisioning server 114, and any remaining user device(s) (e.g., 102) associated with the user 100 performing a scaled down provisioning process to obtain provisioning information that can be used by the remaining user device(s) to obtain provisioning information so that the remaining user device(s) can establish a connection with the WLAN 110. The scaled-down provisioning process can omit the following tasks that are part of the full onboarding procedure: entering user credentials in an onboarding portal and user authentication.

The provisioning server 114 is connected to the WLAN 110. The provisioning server 114 can be implemented using a computer or multiple computers. In some examples, the user devices 101 and 102 are able to perform certain communications with the provisioning server 114 over the WLAN 110 prior to association of the user devices 101 and 102 with the AP 112. Such pre-association communications are performed for purposes of provisioning the user devices 101 and 102 so that they are able to obtain a network profile to associate with the AP 112.

The user device 101 includes an onboarding application 121 and a browser 131. The onboarding application 121 can perform the following tasks in some examples: perform a provisioning procedure with the provisioning server 114 to obtain an access secret and a network profile, and manage sharing of provisioning information with other user devices (e.g., 102). The onboarding application 121 includes machine-readable instructions in an application layer of the user device 101. In other examples, a user device can include a different type of an onboarding program, which may include machine-readable instructions in an operating system (OS) layer, a firmware layer, or another layer of the user device 101.

The browser 131 can perform the following tasks in some examples: receive a provisioning URL that can be used to start an onboarding procedure, access a resource (e.g., a web resource such as a web page) of the provisioning server 114 to perform user authentication; and initiate the onboarding application 121 to perform the provisioning procedure.

Although reference is made to use of both the onboarding application 121 and the browser 131 in some examples, in other examples, the tasks of the onboarding application 121 and the browser 131 can be integrated into a single program, such as the onboarding application 121.

The onboarding application 121 controls display of an onboarding user interface (UI) 140 in a display device 141 of the user device 101. The browser 131 controls display of a browser UI 142 in the display device 141. Each of the onboarding UI 140 and the browser UI 142 can present user-activable control elements (e.g., graphical user interface (GUI) elements such as drop-down menus, control buttons, input fields, etc.) that can be used to perform device provisioning in accordance with some examples of the present disclosure. The control elements in the onboarding UI 140 and the browser UI 142 are discussed further below.

The user device 101 further includes a communication interface 151 that allows the user device 101 to communicate wirelessly with the AP 112 of the WLAN 110. The user device 101 can also communicate with other devices, including the user device 102 and an administrator device 144. The communications between the user device 101 and the other devices can employ the communication interface 151 or one or more other communication interfaces (not shown). Such other communication interface(s) can include a short-range radio frequency (RF) communication interface or another type of communication interface.

The user device 102 similarly includes an onboarding application 122 and a browser 132. The user device 102 also includes a communication interface 152 (and possibly other communication interfaces). The user device 102 can further include additional components similar to those included in the user device 101.

The administrator device 144 is an electronic device used by an administrator of the WLAN 110. The administrator can assist users in onboarding a user device to the WLAN 110. As depicted in FIG. 1, the administrator device 144 includes a memory 146 that stores a provisioning URL 148. The administrator can cause the administrator device 144 to send (at 150) the provisioning URL 148 to the user device 101. The provisioning URL 148 can be sent from the administrator device 144 to the user device 101 in one of various different ways: by email, by text, by displaying a quick response (QR) code in a display device of the administrator device 144 or at another location, by writing a representation of the provisioning URL 148 to a memory 164 of the user device 101 (e.g., as part of a configuration operation performed by the administrator using the administrator device 144), or by another mechanism. In other examples, functionalities of the administrator device 144 discussed herein can be included in the user device 101.

In other examples, a provisioning URL can be provided to the user device 101 in a different way. For example, the user device 101 may be configured with the provisioning URL from another source, the user 100 may obtain the provisioning URL from another source and download the provisioning URL to the user device 101, and so forth.

A "memory" can be implemented using a collection of memory devices. As used here, a "collection" of items can refer to a single item or multiple items. Thus, a collection of memory devices can include a single memory device or multiple memory devices. Examples of memory devices can include any or some combination of the following: a dynamic random access memory (DRAM) device, a static random access memory (SRAM) device, a flash memory device, and so forth.

The provisioning URL 148 received at the user device 101 is used by the user 100 to start the onboarding procedure according to some examples of the present disclosure. The received provisioning URL 148 can be saved as a provisioning URL 162 in the memory 164 of the user device 101. In some examples, to prevent unauthorized access of the stored provisioning URL 162, the stored provisioning URL 162 can be in encrypted form. Also, the provisioning URL 148 sent from the administrator device 144 to the user device 101 can be in encrypted form, which protects the provisioning URL from unauthorized access in examples where the communication link between the administrator device 144 and the user device 101 is insecure.

The provisioning URL 162 is accessible by the browser 131 in response to a user activating a provisioning link control element 165 in the browser UI 142. In response to user activation of the provisioning link control element 165, the browser 131 retrieves the provisioning URL 162 from the memory 164. If the provisioning URL 162 is in encrypted form, the browser 131 can decrypt the encrypted form of the provisioning URL 162 using a decryption key to obtain a clear version of the provisioning URL 162.

The provisioning URL 162 refers to a resource (e.g., a web page) provided by the provisioning server 114. More specifically, the provisioning URL 162 can refer to a provisioning access page of the provisioning server 114. The browser 131 uses the provisioning URL to navigate to the provisioning access page, and the browser 131 presents the content of the provisioning access page at the user device 101. More generally, the provisioning URL refers to another type of onboarding portal or resource that can be accessed using the provisioning URL 162.

The content of the provisioning access page when presented by the browser 131 in the browser UI 142 include further control elements that allows the user 100 to continue with the onboarding procedure. Examples of the control elements that are included in the provisioning access page include an authenticate control element 166 and an initiate provisioning control element 168.

The authenticate control element 166 when activated by the user 100 initiates an authentication procedure between the user device 101 and the provisioning server 114, and the initiate provisioning control element 168 when activated by the user 100 initiates a provisioning procedure via the onboarding application 121 between the user device 101 and the provisioning server 114.

As part of the provisioning procedure performed in response to the activation of the initiate provisioning control element 168, the user device 101 receives the following provisioning information from the provisioning server 114: an access secret 178 and a network profile 180.

Examples of the information in the network profile 180 are discussed further above. The access secret 178 refers to security information that is useable at a user device (e.g., 102) to obtain provisioning information from the provisioning server 114.

In response to receiving the access secret 178 at the user device 101, the user device 101 generates an access token 170 that is stored in the memory 164 of the user device 101. In some examples, the access token 170 is the access secret 178. In other examples, the access token 170 is derived from the access secret 178. In the latter examples, the access secret 178 can include a one-time password (OTP), and the user device 101 can derive a long-live token based on the OTP to use as the access token 170.

The user device 101 stores the access token 170 in the memory 164. The user device 101 also stores the received network profile 180 as a network profile 172 in the memory 164. In some examples, the access token 170 and the network profile 172 can be stored in encrypted form in the memory 164. The memory 164 may be a sandboxed memory in some examples. A "sandboxed" memory refers to a memory that can be accessed by just certain entities (e.g., the onboarding application 121 and the browser 131); the sandboxed memory cannot be accessed by other entities.

As noted above, the initiate provisioning control element 168 (displayed in the browser UI 142) when activated by the user 100 initiates a provisioning procedure via the onboarding application 121 between the user device 101 and the provisioning server 114. More specifically, in some examples, when the initiate provisioning control element 168 is activated, the onboarding application 121 is launched, and the launched onboarding application 121 performs the provisioning procedure with the provisioning server 114 to obtain the access secret 178 and the network profile 180 from the provisioning server 114.

Once the provisioning procedure is complete, the user 100 can activate a share network provisioning information control element 182 in the onboarding UI 140 to cause the onboarding application 121 to share the provisioning URL 162 and the access token 170 with one or more other user devices (e.g., 102) of the user 100.

The browser 132 of the user device 102 can use the provisioning URL 162 to navigate to the provisioning access page of the provisioning server 114, following which the browser 132 can provide the access token 170 to the provisioning server 114 to obtain provisioning information, including the network profile 180, from the provisioning server 114. The user device 102 uses the network profile 180 to establish associate with the AP 112 and perform communications over the WLAN 110.

The provisioning server 114 includes a memory 174 that stores user provisioning information 176 associated with the user 100. Multiple instances of the user provisioning information 176 can be stored for respective different users. The user provisioning information 176 includes the access secret 178 and the network profile 180. The access secret 178 and the network profile 180 can be sent from the provisioning server 114 to the user device 101 as part of the onboarding procedure discussed above.

Figure 2:
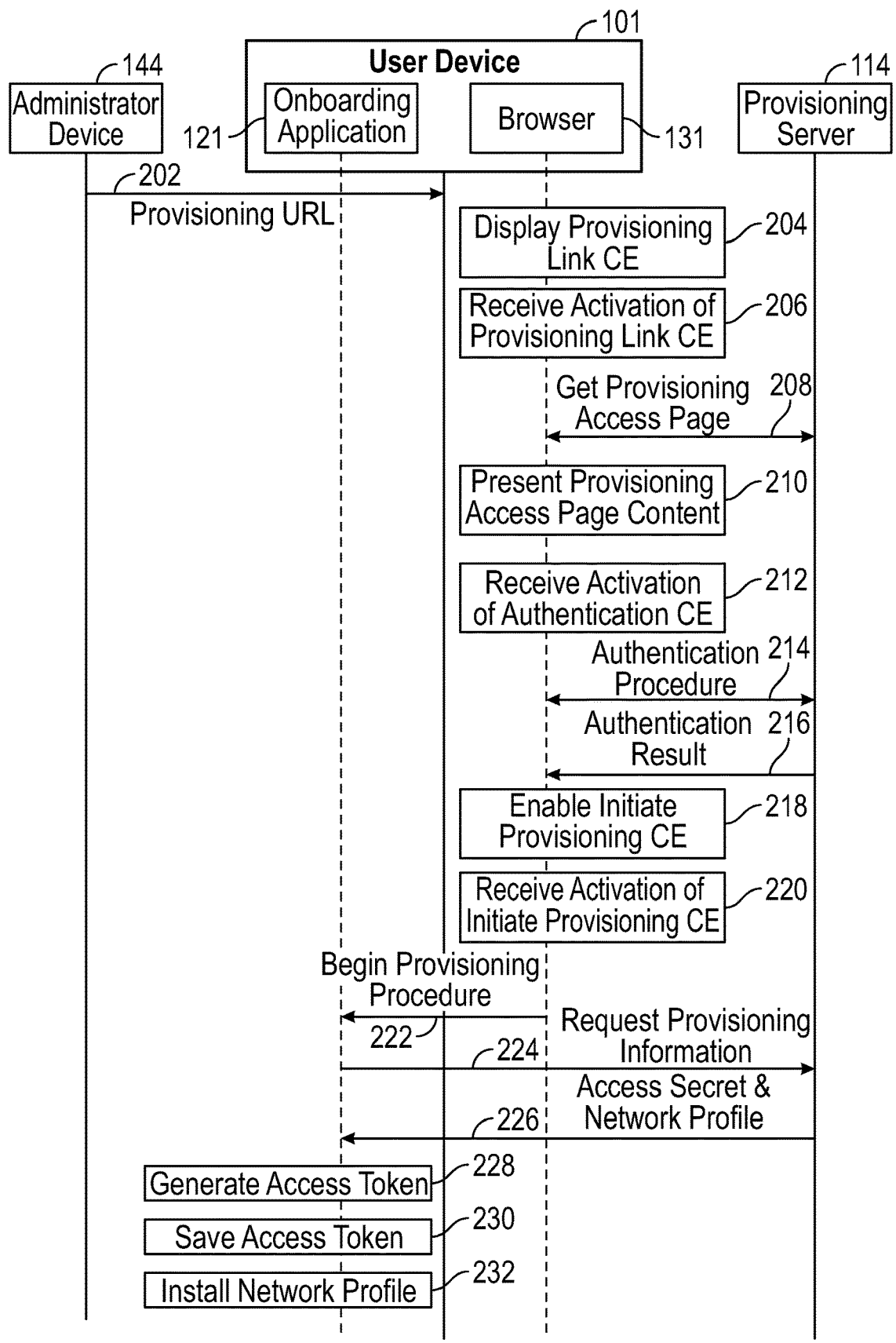
FIG. 2 is a flow diagram of an onboarding procedure for a first user device, according to some examples.

FIG. 2 is a flow diagram of an onboarding procedure that can be performed at the user device 101 in conjunction with the administrator device 144 and the provisioning server 114. Alternatively, a similar onboarding procedure may be performed first at the user device 102 to obtain provisioning information at the user device 102, and the user device 102 can then share the provisioning information with the user device 101 so that the user device 101 does not have to repeat the onboarding procedure.

In different examples, tasks can be performed in an order different from the order shown in FIG. 2, some tasks may be omitted, other tasks may be added, and some tasks may be performed in parallel. The following refers to both FIG. 1 and FIG. 2.

The administrator device 144 sends (at 202) the provisioning URL 148 to the user device 101. In response to receiving the provisioning URL 148 from the administrator device 144, the user device 101 stores the provisioning URL 162 in the memory 164, and the browser 131 displays (at 204) the provisioning link control element (CE) 165 in the browser UI 142. The browser 131 receives (at 206) an indication of a user activation of the provisioning link control element 165. The activation of the provisioning link control element 165 causes the browser 131 to retrieve the provisioning URL 162 from the memory 164. The browser 131 then gets (at 208) the provisioning access page referenced by the provisioning URL 162 from the provisioning server 114.

The browser 131 presents (at 210) the content of the provisioning access page in the browser UI 142. As noted above, the provisioning access page can include the authenticate control element 166 and the initiate provisioning control element 168, which are displayed by the browser 131 in the browser UI 142.

The browser 131 receives (at 212) an indication of a user activation of the authenticate control element 166. In response to the activation of the authenticate control element 166, the user device 101 begins an authentication procedure (at 214) with the provisioning server 114. The authentication procedure includes the browser 131 presenting a prompt in the browser UI 142 for the user 100 to enter credentials for authenticating the user 100. The prompt can be from an authentication page of the provisioning server 114 obtained by the browser 131.

Although FIG. 2 depicts the user device 101 performing the authentication procedure with the provisioning server 114, in other examples, the user device 101 can perform the authentication procedure with a different server, such as an authentication server (e.g., an Authentication, Authorization, and Accounting (AAA) server or another type of authentication server).

In response to the authentication procedure, the provisioning server 114 (or a different server) may provide (at 216) an authentication result indicating whether or not the authentication procedure was successful. The authentication result can include a message containing an authentication response from the provisioning server 114 (or a different server). If the credentials entered by the user 100 are valid, then the provisioning server 114 (or a different server) may be able to successfully authenticate the user 100, and the authentication result would indicate a successful authentication. However, if the credentials entered by the user 100 are invalid, then the authentication of the user 100 would fail at the provisioning server 114 (or a different server), and the authentication result would indicate a failed authentication.

The following assumes that the authentication result indicates a successful authentication.

In response to the successful authentication of the user 100 indicated by the authentication result, the browser 131 can enable (at 218) the initiate provisioning control element 168 in the browser UI 142. Prior to the successful authentication of the user 100, the initiate provisioning control element 168 may not be enabled (e.g., may be grayed out) so that the user 100 would not be able to activate the initiate provisioning control element 168.

Once the initiate provisioning control element 168 is enabled, the user 100 can activate the initiate provisioning control element 168. The browser 131 receives (at 220) an indication of a user activation of the initiate provisioning control element 168. In response, the browser 131 triggers (at 222) the onboarding application 121 to begin the provisioning procedure. In the provisioning procedure, the onboarding application 121 can send (at 224) a request to the provisioning server 114 for provisioning information. In an example, the request includes a call of an application programming interface (API) of the provisioning server 114. The call to the API can invoke execution of machine-readable instructions at the provisioning server 114. The call can include a request to obtain the access secret 178 and the network profile 180 contained in the user provisioning information 176 for the user 100 and stored at the provisioning server 114.

In response to the request, the provisioning server 114 sends (at 226) the access secret 178 and the network profile 180 to the onboarding application 121 in the user device 101. The onboarding application 121 generates (at 228) the access token based on the access secret 178. As noted above, the access token can be the access secret 178 or can be derived from the access secret 178 (e.g., based on applying a function on the access secret 178 and possibly other information). The onboarding application 121 saves (at 230) the access token 170 and the network profile 172 in the memory 164 of the user device 101. The onboarding application 121 also installs (at 232) the network profile in the user device, which allows the user device 101 to associate with the AP 112 using the properties in the network profile. Installing a network profile in the user device results in installation of a network configuration in the user device along with a user certificate and server certificate, as examples.

At this point, the user device 101 has been onboarded and provisioned to allow the user device 101 to connect to the WLAN 110. After onboarding the user device 101, the user 100 can initiate provisioning of any other user devices of the user 100. The provisioning of the user's other user devices does not have to perform the full onboarding procedure depicted in FIG. 2.

Figure 3:
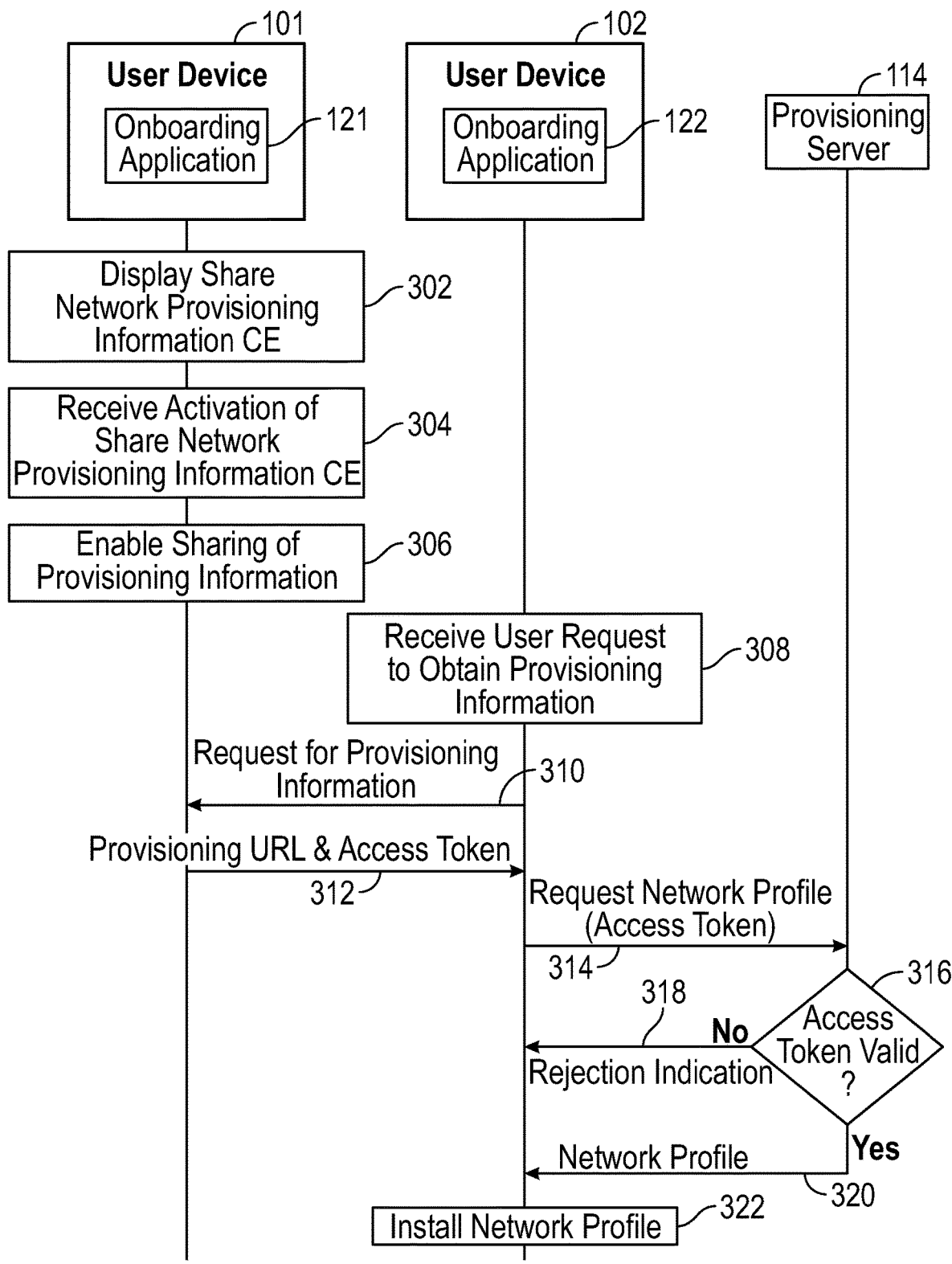
FIG. 3 is a flow diagram of a provisioning procedure for a second user device, according to some examples.

As shown in FIG. 3, a scaled down provisioning of the user device 102 is depicted, according to some examples of the present disclosure. In different examples, tasks can be performed in an order different from the order shown in FIG. 3, some tasks may be omitted, other tasks may be added, and some tasks may be performed in parallel. The following refers to both FIG. 1 and FIG. 3.

After the user device 101 has been onboarded according to FIG. 2, the onboarding application 121 in the user device 101 causes display (at 302) of the share network provisioning information control element 182 in the onboarding UI 140. In response to receiving (at 304) an indication of user activation (e.g., by the user 100) of the share network provisioning information control element 182, the onboarding application 121 enables (at 306) sharing of provisioning information, including the provisioning URL 162 and the access token 170, with any other user devices of the user 100, including the user device 102. The onboarding application 121 can enable the sharing of the provisioning information by setting a flag or other information element, such as in a configuration register or a memory.

At the user device 102, the onboarding application 122 receives (at 308) an indication of a request for provisioning information for the user device 102. For example, the onboarding application 122 may present a control element in a UI that can be activated by the user 100 to request the provisioning information for the user device 102. In response, the onboarding application 122 sends (at 310) a request to the user device 101 for the provisioning information. In some examples, the request to the user device 101 can be sent over a communication link between the user device 101 and the user device 102 (e.g., a short-range RF link such as a Bluetooth link, a Radio Frequency Identification (RFID) link, etc.).

In response to receiving the request from the user device 102, the onboarding application 121 in the user device 101 retrieves the provisioning URL 162 and the access token 170 from the memory 164, and the onboarding application 121 sends (at 312) the provisioning URL 162 and the access token 170 to the user device 102. The provisioning URL 162 and the access token 170 can be sent from the user device 101 to the user device 102 in a secure communication, such as a secure communication protected by a security protocol (e.g., TLS, etc.). The provisioning URL 162 and the access token 170 can be sent to the user device 102 in encrypted form. In some examples, the provisioning URL 162 and the access token 170 can be sent in a message (e.g., an email message, a text message, etc.) or a file. In other examples, the provisioning URL 162 and the access token 170 can be encoded into a QR code that can be displayed, and the user device 102 can scan the QR code to obtain the provisioning URL 162 and the access token 170. As examples, the QR code can be displayed by the display device 141 of the user device 101 or at another display device.

After receiving the provisioning information from the user device 101, the onboarding application 122 can initiate a provisioning procedure with the provisioning server 114 using the provisioning URL. The user device 102 accesses the resource referenced by the provisioning URL, for the purpose of supplying the access token to the provisioning server 114.

Note that the user device 102 can initiate the provisioning procedure without having to perform the authentication tasks 212, 214, and 216 of FIG. 2. The onboarding application 122 sends (at 314) a request for the network profile to the provisioning server 114. The request can include the access token received from the user device 101. The access token allows the user device 102 to obtain the network profile without having to first perform authentication, since the access token is a representation that the user device 102 is authorized to obtain the network profile.

The provisioning server 114 determines (at 316) whether the access token is valid. If the access token is not valid (e.g., the access token received from the user device 102 does not match an access token stored at the provisioning server 114), the provisioning server 114 sends (at 318), to the user device 102, a rejection indication to deny the request for the network profile. If the access token is valid (e.g., the access token received from the user device 102 matches an access token stored at the provisioning server 114), the provisioning server 114 sends (at 320), to the user device 102, the network profile.

Upon receiving the network profile, the onboarding application 122 installs (at 322) the network profile in the user device 102, which allows the user device 102 to establish a connection with the WLAN 110.

Figure 4:
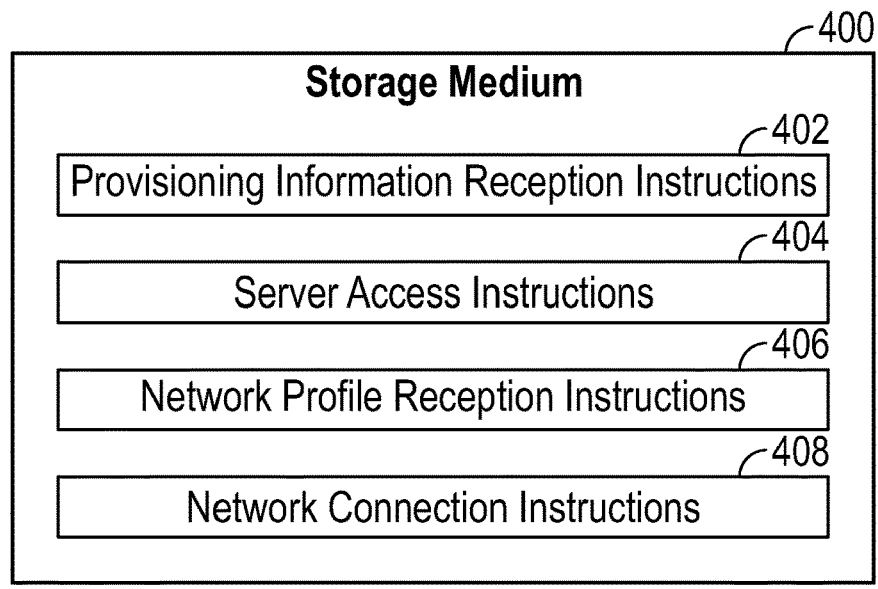
FIG. 4 is a block diagram of a storage medium storing machine-readable instructions executable by a user device, according to some examples.

FIG. 4 is a block diagram of a non-transitory machine-readable or computer-readable storage medium 400 storing machine-readable instructions that upon execution cause a first user device to perform various tasks. The first user device can be the user device 102 of FIG. 1, for example.

The machine-readable instructions include provisioning information reception instructions 402 to receive, from a second user device (e.g., 101 in FIG. 1), a provisioning reference (e.g., a provisioning URL) and an access token. The provisioning reference and the access token were obtained by the second user device as part of a provisioning procedure (e.g., 224, 226 in FIG. 2) performed by the second user device with a server (e.g., the provisioning server 114 of FIG. 1). In some examples, the machine-readable instructions request provisioning information from the second user device. The receiving of the provisioning reference and the access token is in response to the request.

In some examples, the requesting of the provisioning information from the second user device is performed by an onboarding application (e.g., 122 in FIG. 1) executed at the first user device. In some examples, the receiving of the provisioning reference and the access token is from an onboarding application (e.g., 121 in FIG. 1) executed at the second user device.

The machine-readable instructions include server access instructions 404 to access, by the first user device, the server using the provisioning reference and the access token, to provision the first user device. For example, the access can include sending a request for a network profile to the server (e.g., 314 in FIG. 3).

The machine-readable instructions include network profile reception instructions 406 to receive, at the first user device from the server, a network profile in response to the access token. In some examples, the network profile is sent by the server to the first user device if an access token included in the request is successfully validated.

The machine-readable instructions include network connection instructions 408 to connect, by the first user device, to a network (e.g., the WLAN 110 of FIG. 1) using the network profile. For example, the network profile includes various properties that can be used by the first user device to associate with an AP (e.g., 112 in FIG. 1). The machine-readable instructions can install, using an onboarding application, the network profile in the first user device.

Figure 5:
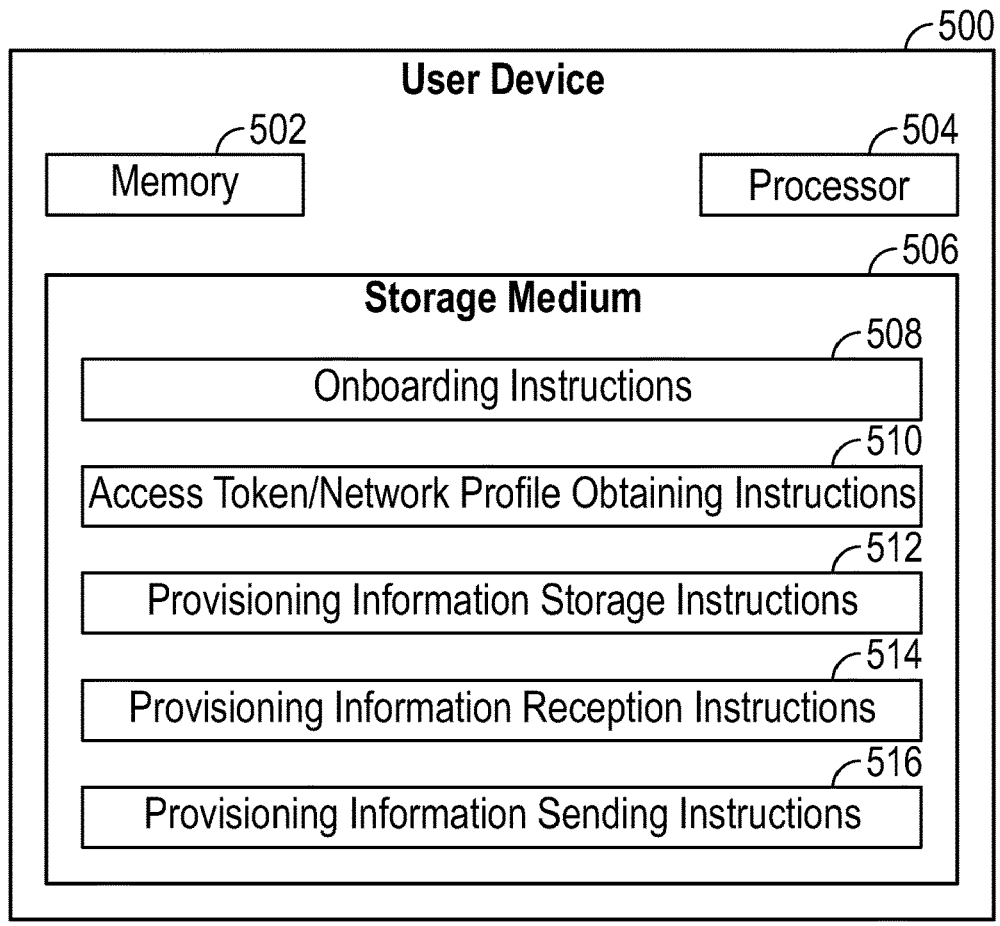
FIG. 5 is a block diagram of a user device according to some examples.

FIG. 5 is a block diagram of a user device 500 (referred to as a "first user device 500"), which can be the user device 101 of FIG. 1. The first user device 500 includes a memory 502 and a processor 504 (or multiple processors). A processor can include a microprocessor, a core of a multi-core microprocessor, a microcontroller, a programmable integrated circuit, a programmable gate array, or another hardware processing circuit.

The first user device 500 further includes a non-transitory storage medium 506 storing machine-readable instructions executable on the processor 504 to perform various tasks. Machine-readable instructions executable on a processor can refer to the instructions executable on a single processor or the instructions executable on multiple processors.

The machine-readable instructions in the storage medium 506 include onboarding instructions 508 to perform an onboarding procedure using a provisioning reference (e.g., a provisioning URL) with a server (e.g., the provisioning server 114 of FIG. 1) to provision the first user device 500 to connect to a network (e.g., the WLAN 110 of FIG. 1).

The machine-readable instructions in the storage medium 506 include access token/network profile obtaining instructions 510 to, as part of the onboarding procedure, obtain an access token and a network profile useable by the first user device 500 to connect to the network. For example, the access token and the network profile can be obtained at 226 in FIG. 2.

The machine-readable instructions in the storage medium 506 include provisioning information storage instructions 512 to store a representation of the provisioning reference and the access token in the memory. In some examples, the representation of the provisioning reference and the access token is an encrypted form of the provisioning reference and the access token.

The machine-readable instructions in the storage medium 506 include provisioning information request reception instructions 514 to receive, at the first user device from a second user device (e.g., 102 in FIG. 1), a request for provisioning information.

The machine-readable instructions in the storage medium 506 include provisioning information sending instructions 516 to, in response to the request, retrieve the provisioning reference and the access token from the memory and provide the provisioning reference and the access token from the first user device to the second user device. In some examples, the provisioning reference and the access token are provided in a QR code, which can be displayed by the machine-readable instructions in a display device of the first user device or another device.

Figure 6:
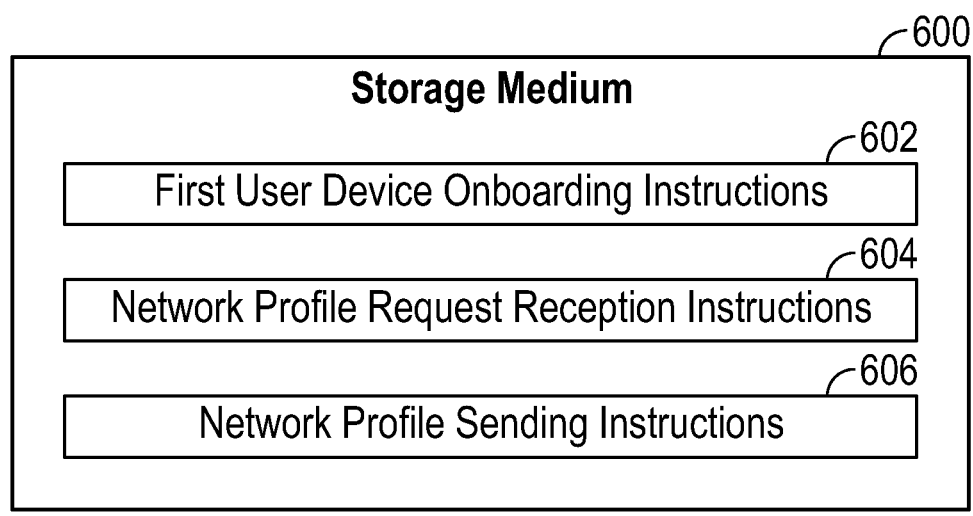
FIG. 6 is a block diagram of a storage medium storing machine-readable instructions executable by a provisioning server, according to some examples.

FIG. 6 is a non-transitory machine-readable or computer-readable storage medium 600 storing machine-readable instructions that upon execution cause a provisioning server (e.g., 114 in FIG. 4) to perform various tasks.

The machine-readable instructions in the storage medium 600 include first user device onboarding instructions 602 to perform, with a first user device (e.g., 101 in FIG. 1), an onboarding procedure. The onboarding procedure includes authenticating the first user device (e.g., authenticate a user of the first user device using user credentials) and providing, from the provisioning server to the first user device, an access token and a network profile. The network profile includes properties useable by the first user device to connect to a network (e.g., WLAN 110 in FIG. 1).

The machine-readable instructions in the storage medium 600 include network profile request reception instructions 604 to receive, at the provisioning server from a second user device (e.g., 102 in FIG. 1) different from the first user device, a request for the network profile. The request includes the access token that was received by the second user device from the first user device.

The machine-readable instructions in the storage medium 600 include network profile sending instructions 606 to, based on validating the access token, send, from the provisioning server to the second user device, the network profile to allow the second user device to connect to the network.

In some examples, the access token was received by the second user device from the first user device without the second user device performing an onboarding procedure with the provisioning server.

A storage medium (400 in FIG. 4, 506 in FIG. 5, or 600 in FIG. 6) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a first user device to:
   send, from an onboarding program in the first user device, a request for provisioning information to a second user device;
   receive, at the first user device, a provisioning reference and an access token sent from the second user device as a response to the request, the access token obtained by an onboarding program of the second user device as part of a provisioning procedure performed by the second user device with a server based on the second user device accessing a resource of the server referenced by the provisioning reference;
   access, by the first user device, the resource of the server referenced by the provisioning reference received by the first user device from the second user device;
   send, from the first user device, the access token to the server to provision the first user device;
   receive, at the first user device from the server, a network profile in response to the access token; and
   connect, by the first user device, to a network using the network profile.

2. The non-transitory machine-readable storage medium of claim 1, wherein the provisioning reference comprises a provisioning uniform resource locator (URL) that refers to the resource of the server relating to provisioning user devices.

3. The non-transitory machine-readable storage medium of claim 1, wherein the network profile comprises information of a type of authentication to employ.

4. The non-transitory machine-readable storage medium of claim 1, wherein the provisioning reference and the access token are sent from the second user device based on activation of sharing of provisioning information in an onboarding user interface of the second user device.

5. The non-transitory machine-readable storage medium of claim 1, wherein the access token is based on an access secret obtained by the second user device from the server.

6. The non-transitory machine-readable storage medium of claim 1, wherein the instructions upon execution cause the first user device to:
   install, using the onboarding program in the first user device, the network profile in the first user device.

7. The non-transitory machine-readable storage medium of claim 1, wherein the accessing of the resource by the first user device of the server referenced by the provisioning reference comprises calling, by the first user device, an application programming interface (API) of the server.

8. The non-transitory machine-readable storage medium of claim 1, wherein the provisioning reference and the access token are received at the first user device from the second user device in a secure communication.

9. The non-transitory machine-readable storage medium of claim 1, wherein the provisioning reference and the access token are received at the first user device from the second user device using a quick response (QR) code.

10. The non-transitory machine-readable storage medium of claim 1, wherein the provisioning reference and the access token are received at the first user device from the second user device in a file or a message.

11. A first user device comprising:
    a memory;
    a processor; and
    a non-transitory storage medium storing instructions executable on the processor to:
    perform an onboarding procedure using a provisioning reference with a server to provision the first user device to connect to a network;
    present content of a resource referenced by the provisioning reference, the content comprising:

a first user-activatable control element that when activated causes the first user device to perform an authentication procedure, and a second user-activatable control element that when activated causes the first user device to perform the onboarding procedure to obtain an access token and a network profile;

disable the second user-activatable control element before a successful performance of the authentication procedure;

enable the second user-activatable control element in response to the successful performance of the authentication procedure;

as part of the onboarding procedure, obtain the access token and the network profile after the successful performance of the authentication procedure, the network profile useable by the first user device to connect to the network;

store a representation of the provisioning reference and the access token in the memory;

receive, at the first user device from a second user device, a request for provisioning information; and in response to the request, retrieve the provisioning reference and the access token from the memory and provide the provisioning reference and the access token from the first user device to the second user device.

12. The first user device of claim 11, wherein the network profile comprises information of a type of authentication to employ.

13. The first user device of claim 11, wherein the instructions are executable on the processor to:

trigger the onboarding procedure responsive to an activation of the second user-activatable control element after the second user-activatable control element has been enabled.

14. The first user device of claim 13, wherein the activation of the second user-activatable control element is received at a browser, and wherein the browser responds to the activation of the second user-activatable control element by triggering an onboarding program to perform the onboarding procedure.

15. The first user device of claim 11, wherein the instructions are executable on the processor to obtain the access token by receiving an access secret from the server and generating the access token based on the access secret.

16. The first user device of claim 11, wherein the provisioning reference and the access token are provided in a quick response (QR) code.

17. The first user device of claim 16, wherein the instructions are executable on the processor to display the QR code in response to the request.

18. A method comprising:

sending, from an onboarding program in a first user device, a request for provisioning information to a second user device;

receiving, at the first user device, a provisioning reference and an access token sent from the second user device as a response to the request, the access token obtained by an onboarding program of the second user device as part of a provisioning procedure performed by the second user device with a server based on the second user device accessing a resource of the server referenced by the provisioning reference;

accessing, by the first user device, the resource of the server referenced by the provisioning reference received by the first user device from the second user device;

sending, from the first user device, the access token to the server to provision the first user device;

receiving, at the first user device from the server, a network profile in response to the access token; and connecting, by the first user device, to a network using the network profile.

19. The method of claim 18, wherein the provisioning reference and the access token are sent from the second user device based on activation of sharing of provisioning information in an onboarding user interface of the second user device.

20. The method of claim 18, wherein the network profile comprises information of a type of authentication to employ.

* * * * *